United States Patent
Zhang et al.

(10) Patent No.: US 10,958,547 B2
(45) Date of Patent: Mar. 23, 2021

(54) VERIFY A NETWORK FUNCTION BY INQUIRING A MODEL USING A QUERY LANGUAGE

(71) Applicant: HEWLETT PACKARD ENTERPRISE DEVELOPMENT LP, Houston, TX (US)

(72) Inventors: Ying Zhang, Palo Alto, CA (US); Sujata Banerjee, Palo Alto, CA (US); Joon-Myung Kang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 871 days.

(21) Appl. No.: 15/261,701

(22) Filed: Sep. 9, 2016

(65) Prior Publication Data

US 2018/0077037 A1 Mar. 15, 2018

(51) Int. Cl.
  *G06F 16/00* (2019.01)
  *H04L 12/26* (2006.01)
  (Continued)

(52) U.S. Cl.
  CPC ........ *H04L 43/0817* (2013.01); *G06F 16/951* (2019.01); *H04L 12/66* (2013.01);
  (Continued)

(58) Field of Classification Search
  CPC ... H04L 43/0817; H04L 43/18; H04L 47/125; H04L 61/2514; H04L 41/0866; H04L 41/024; H04L 12/66; G06F 16/951
  (Continued)

(56) References Cited

U.S. PATENT DOCUMENTS 5,867,649 A * 2/1999 Larson .................... G06F 8/314
                                                    709/201
6,134,580 A * 10/2000 Tahara .................. G06F 9/4862
                                                    709/202

(Continued)

FOREIGN PATENT DOCUMENTS

WO    2017/131765 A1    8/2017

OTHER PUBLICATIONS

Gabriel Brown, "Service Chaining in Carrier Networks," Heavy Reading, White Paper, Feb. 2015, pp. 1-13.

(Continued)

*Primary Examiner* — Shiow-Jy Fan
(74) *Attorney, Agent, or Firm* — Hewlett Packard Enterprise Patent Department (57) ABSTRACT

In some examples, a system can verify a network function by inquiring a model using a query language is described. In some examples, the system can include at least a memory and a processor coupled to the memory. The processor can execute instructions stored in the memory to transmit a plurality of packets into at least one network function that is unverifiable; describe the at least one network function using a model comprising a set of match action rules and a state machine; inquire the model using a query language comprising a temporal logic to obtain a query result indicating an expected behavior of the plurality of packets; and verify the at least one network function based on the query result and the expected behavior of the plurality of packets.

18 Claims, 9 Drawing Sheets

(51) Int. Cl.
*H04L 12/66* (2006.01)
*G06F 16/951* (2019.01)
*H04L 29/12* (2006.01)
*H04L 12/24* (2006.01)

(52) U.S. Cl.
CPC ........ *H04L 41/024* (2013.01); *H04L 41/0866* (2013.01); *H04L 61/2514* (2013.01); *H04L 43/18* (2013.01)

(58) Field of Classification Search
USPC ........................................................ 707/770
See application file for complete search history.

(56) References Cited

U.S. PATENT DOCUMENTS

| | | | |
|---|---|---|---|
| 7,788,353 | B2 | 8/2010 | Le et al. |
| 8,554,901 | B2 | 10/2013 | Allan |
| 9,117,227 | B1* | 8/2015 | Agrawal ............ G06Q 30/0242 |
| 2003/0046658 | A1* | 3/2003 | Raghavan ................ G06F 8/44 |
| | | | 717/106 |
| 2006/0106773 | A1* | 5/2006 | Chang ............... G06F 16/90344 |
| 2006/0230364 | A1* | 10/2006 | Zhivova ............. G06F 17/5022 |
| | | | 716/103 |
| 2007/0192863 | A1* | 8/2007 | Kapoor ................... G06F 9/505 |
| | | | 726/23 |
| 2010/0011434 | A1* | 1/2010 | Kay ........................ H04L 43/00 |
| | | | 726/14 |
| 2010/0188975 | A1* | 7/2010 | Raleigh ............ G06Q 10/06375 |
| | | | 370/230.1 |
| 2011/0214157 | A1* | 9/2011 | Korsunsky .............. G06F 21/55 |
| | | | 726/1 |
| 2011/0320419 | A1* | 12/2011 | Johnston ............... G06F 16/219 |
| | | | 707/703 |
| 2012/0113835 | A1* | 5/2012 | Alon .................... H04L 43/0817 |
| | | | 370/252 |
| 2012/0240185 | A1* | 9/2012 | Kapoor ............... H04L 63/1425 |
| | | | 726/1 |
| 2014/0280268 | A1 | 9/2014 | Mckay |
| 2015/0131484 | A1 | 5/2015 | Aldrin |
| 2015/0163150 | A1 | 6/2015 | Beheshti-Zavareh et al. |
| 2016/0036636 | A1* | 2/2016 | Erickson ............... H04L 41/145 |
| | | | 370/248 |

OTHER PUBLICATIONS

Hewlett Packard Enterprise Development LP; PCT/US2016015747; Filed Jan. 29, 2016; 29 Pages.
S. Fayazbakhsh et al., "Flowtags: Enforcing Network-wide Policies in the Presence of Dynamic Middlebox Actions," HotSDN'13, Hong Kong, China, Aug. 16, 2013, pp. 1-6, ACM.
Xie et al., "On static reachability analysis of ip networks", In INFOCOM: Annual Joint Conf. of the IEEE Computer and Communications Societies, 2005, pp. 2170-2183.
Khurshid et al., "VeriFlow: Verifying Network-Wide Invariants in Real Time", ACM SIGCOMM Computer Communication Review, vol. 42, No. 4, 2012, pp. 467-472.
Kazemian et al., "Real Time Network Policy Checking using Header Space Analysis", In Proceedings of the 10th USENIX Symposium on Networked Systems Design and Implementation (NSDI '13), Apr. 2013, pp. 99-111.
Kazemian et al., "Header Space Analysis: Static Checking for Networks", In Proceedings of the 9th USENIX Symposium on Networked Systems Design and Implementation (NSDI), Apr. 2012, 14 pages.
Joseph et al., "Modeling middleboxes", Network Magazine of Global Internetworking, vol. 22, Issue 5, 2008, pp. 20-25.
Fayaz et al., "Testing Stateful and Dynamic Data planes with FlowTest", In HotSDN 2014, pp. 79-84.

* cited by examiner

*FIG. 1*

MODEL 200

| PRIMITIVES 210 | TYPES 220 | DESCRIPTIONS 230 |
|---|---|---|
| UNITS 240 | f | Flow f |
| | f.p | Packet p in flow f |
| | f.p.field | Header field in packet p in flow f |
| STATE OPERATIONS 250 | set (f, val) | Set the NF's internal state of f with val |
| | get (f) | Get the NF's internal state of f |
| | timeout(f, val) | If there is no activity for flow f after val seconds, NF's internal state for f's timeouts and is removed. |
| PRECONDITION 260 | IF (f.p, P) | Match f.p on pattern P |
| | IF (f, P) | Match f on pattern P |
| | IF (protoAnalyzer(f), P) | protoAnalyzer generates event of f, check if the event matches pattern P |
| ACTION 270 | MODIFY() | Modify a packet or a header field |
| | FORWARD() | Forward a packet or a flow |
| | DROP() | Drop transmission of a packet or a flow |
| | ENCAP() | Encapsulate a packet or a header field |
| | DECAP() | Decapsulate a packet or a header field |
| | RATELIMIT() | Limit transmission rate of a packet or a flow |

*FIG. 2*

RULES
300

| MATCH (f, s) 310 | ACTION 320 |
|---|---|
| IF (f.p.src, INTERNAL), get (f) == NEW | set (f, newport)<br>modify ([f.p.src, f.p.sp], [IPpub, newport])<br>forward (f, out) |
| IF (f.p.src, EXTERNAL), get (f) == MAPPED | modify ([f.p.dst, f.p.dp], [get(f)] )<br>forward (f, in) |
| IF (f.p.src, INTERNAL), get (f) == MAPPED | modify ([f.p.src, f.p.sp], [IPpub, get(f)] )<br>forward (f, out) |

RULES
400

| MATCH (f, s) 410 | ACTION 420 |
|---|---|
| IF (f.p.dst, SERVER), get (f) == NEW | set (f, Wi)<br>modify (f.p.dst, Wi)<br>forward (f, out) |
| IF (f.p.src, SERVER), get (f) == SELECTED | modify (f.p.src, get(f) )<br>forward (f, in) |
| IF (f.p.dst, SERVER), get (f) == SELECTED | modify ( f.p.dst, get(f) )<br>forward (f, out) |

RULES 500

| MATCH (f, s) 510 | ACTION 520 |
|---|---|
| get (f)<3, IF (protoAnalyzer(f), SQLI) | set (f.num_sqli++), forward (f, NormalPort) |
| get(f) >= 3 | forward (f, HoneyPot) |

RULES
600

| MATCH (f, s) 610 | ACTION 620 |
|---|---|
| IF (f.p.src, INTERNAL), get (f) == NEW | set (f, WAITING) forward (f, out) |
| IF (f.p.src, INTERNAL), get (f) == WAITING, IF (protoAnalyzer(f), TCPEstablished) | set (f, ESTABLISH ) forward (f, out) |
| IF (f.p.src, INTERNAL), get (f) == WAITING, !IF (protoAnalyzer(f), TCPEstablished) | forward (f, out) |
| IF (f.p.src, EXTERNAL), get (f) == ESTABLISH | forward (f, in) |
| IF (f.p.src, EXTERNAL), get (f) == WAITING, IF (protoAnalyzer(f), TCPConnOpen) | forward (f, in) |

| EXAMPLE 710 | QUERY 720 |
|---|---|
| All packets traversing a service chain | AllPackets(FW.0^swtich*^IDS.1^switch*^LB.0) |
| Packet sequence allowed on a service chain | AllPacketSeq(FW^switch*^IDS^switch*^LB) |
| Path of packets | AllPaths(pkt=(srcIP='1.1.1.1' & dstIP='2.2.2.2')) |
| Path given a packet sequence | AllPaths(p1^p2*^p3*) |
| Reverse path under the condition of forward path | AllPaths(p1 since p2)<br><br>p1=(srcIP='1.1.1.1' & dstIP='2.2.2.2')<br><br>p2=(srcIP='2.2.2.2' & dstIP='1.1.1.1') |
| Path under the condition of NF states | AllPaths(p1 since FW.state == 1) |
| Path of a packet sequence with an inter-arrival time | AllPaths(p1^10^p2*^100^p3*) |

VERIFY A NETWORK FUNCTION BY INQUIRING A MODEL USING A QUERY LANGUAGE

BACKGROUND

Performing verification for network functions (NFs) and their service chains introduces several challenges. First, NFs maintain states about each connection and perform different actions based on the states. The states vary largely depending on the type of NFs being verified. Second, although verifying the functionality of one NF is tractable, networks often include many NFs that are chained together. To verify a service chain, a framework verifies not just one NF but all NFs and switches that the flows will traverse.

BRIEF DESCRIPTION OF THE DRAWINGS

The following detailed description references the drawings, wherein.

DETAILED DESCRIPTION

Moving towards Network Functions Virtualization (NFV), virtualized appliances can be more flexibly instantiated and dynamically chained, making trouble-shooting network middleboxes difficult. To ensure carrier-grade availability and minimize outages, operations need ways to verify that the automatically deployed network and middlebox configuration complies with higher level network policies. The present disclosure describes a model of the network functions (NFs) and a query language in a verification framework for service chaining to allow operators specify what network invariants to check against.

The model for network functions (NFs) described herein encodes domain specific knowledge about an NF's behavior into a set of actions, states, and temporal relationships between the states. Moreover, the model represents an NF by modeling the temporal relationship between the states as high level primitives. According to examples of the present disclosure, an abstract model for representing NFs uses a combination of state machines and match-action tables. This model is generally applicable to a wide variety of NFs, for example, a network address translator (NAT), a load balancer, an injection detection system, a stateful firewall, etc.

Overview

To accurately verify a service chain, the question of "What does an NF do to a packet?" need to be answered. The actions that an NF performs on any given packet are a function of the NF's source code, configuration files, built-up internal state, and the packet's header and content. Standard program verification techniques to verify an NF often include model checking to its source code. However, NFs are often proprietary, and thus their source code may not be available.

To overcome closed source code, the solution herein is based on two observations. First, although low-level implementation details are unknown, high-level specification and behavior of different middleboxes are well known. For example, firewalls allow traffic from external Internet Protocol (IP) addresses if it is initiated from internal IP addresses.

Second, specific details about how the high-level specification applies to each individual network is stored in the network configuration. Unlike an NF's source code, the configuration files are readily available. For example, the declaration of the set of "Internal" addresses for a firewall are stored in the configuration.

Building on the above observations about an NF's behavior and the configuration files, this solution constructs an abstract model that expresses the high-level behavior captured through domain knowledge as a state machine and expresses the specific details about how this behavior applies to different subsets of traffic as a table with a set of match-action rule entries.

Next, the solution uses domain knowledge and configurations files. Note that the high-level behavior of an NF is known. For example, information, such as, what header fields an NF checks and modifies, or what bit patterns in the packet content are detected, is known. Further, this high-level behavior is shared across NFs of the same "type" regardless of the vendor or manufacturer. Therefore, the domain knowledge can be encoded into a set of state machines. Each state machine captures the high level behavior for a specific type of NFs. Building such an abstract model is scalable, because there are a small number of these "types" middleboxes and the cost of model creation is incurred once.

Moreover, an NF's configuration is parsed for information that allows determining feature sets, parameter values, operator-defined policies, etc. Feature sets generally include many features in a complex NF. For example, a web proxy also has other features, such as, a firewall, a network address translator (NAT), a load balancer, a cache, etc. The NF's configuration allows an operator to enable a selected set of features for each instance. Using this information, the set of state machines to use for a particular NF can be determined.

The NF configurations also contain values of the parameters used in the abstract model. For example, a NAT configuration contains its public IP address and the port range used for the mapping. Using this information, the system can determine how to apply the state machines to different flows in the network.

Some NFs also provide programmable APIs that allow customized policies (or operator-defined policies). For example, an injection detection system (IDS) may have a policy description language that can be used to specify how to handle different events, e.g. what special uniform resource locators (URLs) to look for and how to handle the flow once detected. Other commercial IDS may also support programmable policies using their respective control API. By parsing these configurations, the system can extract the stateful behavior of the NF.

Figure 1:
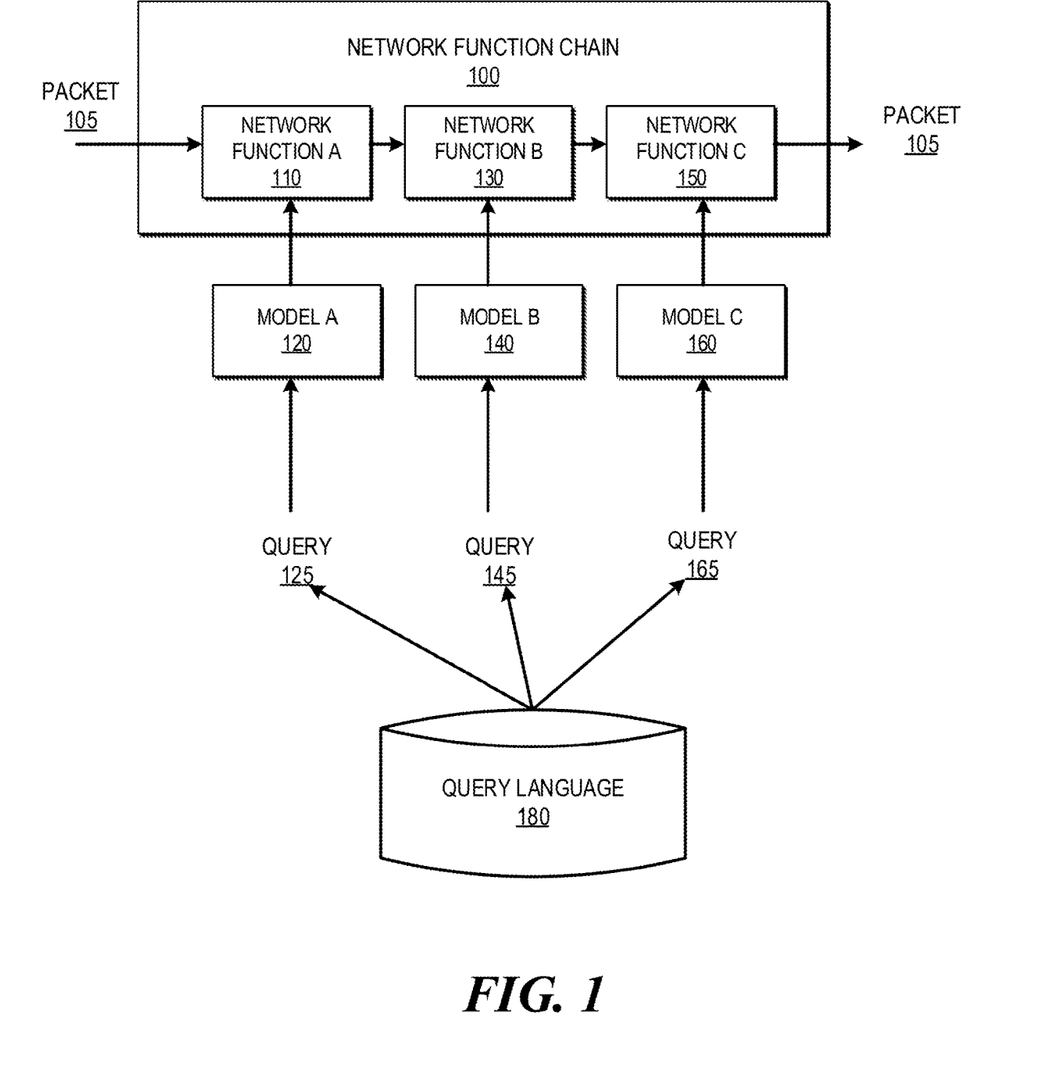
FIG. 1 is a block diagram of an example architecture for network function chain verification by inquiring a model using a query language.

Specifically, FIG. 1 is a block diagram of an example architecture for network function chain verification by inquiring a model using a query language. FIG. 1 includes a network function chain 100 that includes a plurality of network functions, such as network function A 110, network function B 130, network function C 150, etc. Moreover, the architecture includes a plurality of abstract models used to describe the network functions. In this example, model A 120 is constructed to describe network function A 110; model B 140 is constructed to describe network function B 130; and model C 160 is constructed to describe network function C 150. Furthermore, multiple queries, such as, query 125, query 145, and query 165, can be generated using a query language 180. Each query can inquire one or more abstract models to determine whether a specified network invariant has a match in a particular network function (or network function chain). For example, at a high level, a particular network function chain may have a property that specifies that node A shall not be allowed to communicate with node B. In order to verify whether node A and node B in fact do not communicate with each other in an implementation of the particular network function chain, a single query or a combination of queries can be made to a plurality of models.

Detailed definitions and examples of the abstract models and the query language are described in the sections below. These two components are critical to a verification framework for service function chaining. Together, they provide network-wide invariants in real time, which is important to the performance of production networks.

Abstract Model Primitives

In general, an abstract model (e.g., example models described in FIGS. 3A-3B, 4A-4B, 5A-5B, and 6A-6B) comprises of two parts: a match-action table and a state machine. The state machine generally refers to a natural representation of stateful processes. Nodes in the state machine correspond to the states each NF maintains, and edges in the state machine capture the conditions that trigger state transitions. Extending the OpenFlow match-action abstraction, the match-action table contains a number of match-action rules. The match-action rules detects a match on both packet headers and internal states, performs the action on the packets, and changes the internal states.

Figure 2:
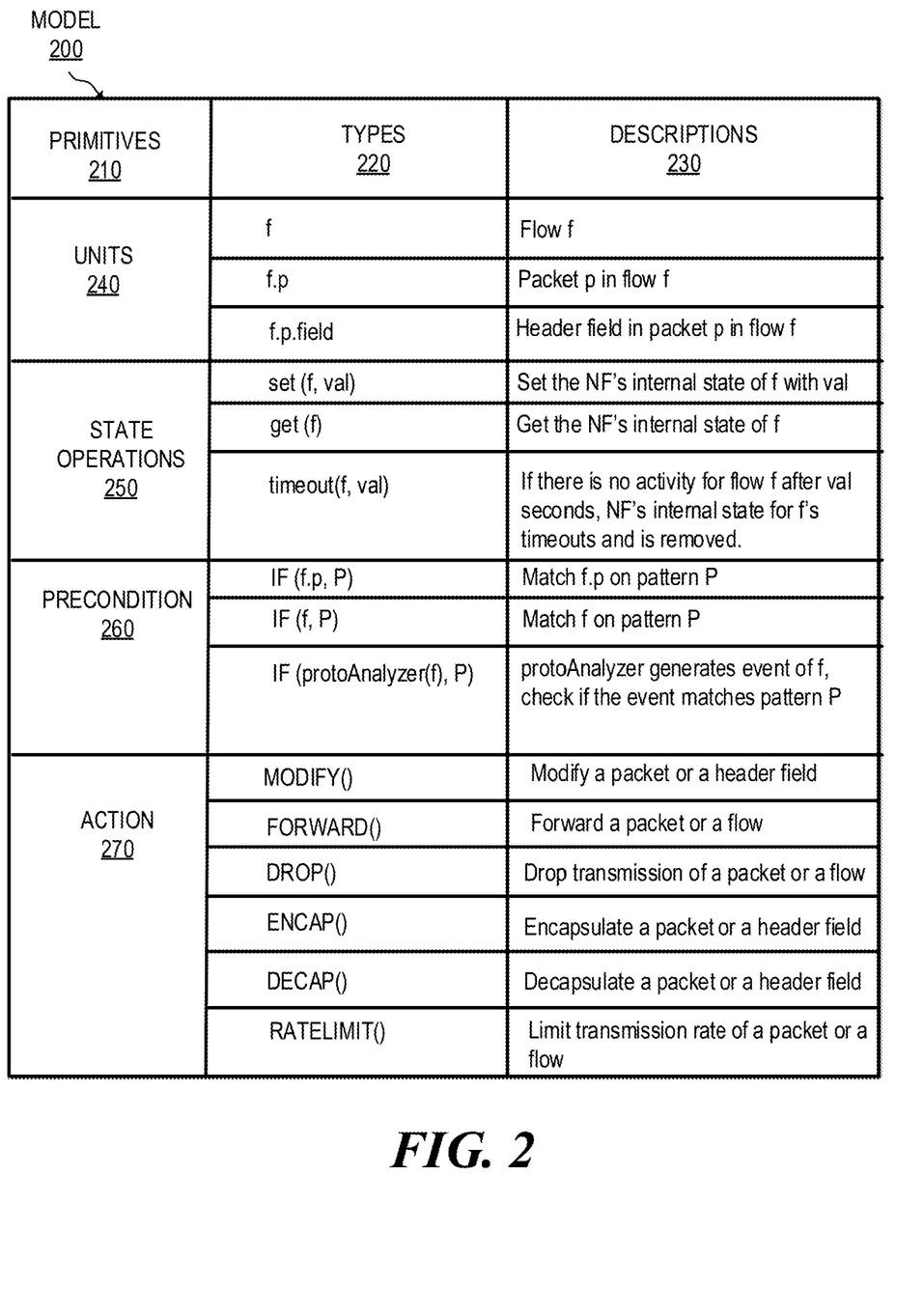
FIG. 2 is a block diagram of example model primitives.

FIG. 2 is a block diagram of an example model primitives. Specifically, model 200 in FIG. 2 includes a plurality of primitives 210, types 220, and descriptions 230. There are four key primitives 210 in model 200, namely, units 240, state operations 250, precondition 260, and action 270. FIG. 2 also includes different types in each unit under types 220, as well as the description of each type under descriptions 230.

A. Units

Units 240 generally refers to an entity on which each action is applied. For example, units 240 can be a particular flow, which may be all packets sharing the same {source IP, source port, destination IP, destination port, protocol} tuple values, e.g., f representing flow f. While OpenFlow rules are defined against each flow, in a stateful network, there may be different rules for packets in the same flow. Therefore, in model 200, rules can be defined against each packet, e.g., f.p representing packet p in flow f. The separation of packet and flow in unit types here is because a stateful NF may treat different packets of the same flow differently. Moreover, units 240 can also be a field in a packet in a flow, e.g., f.p. field representing a header field in a packet p in flow f. The packet p can include a header and a payload (or content). The header may include many different fields, such as, a source IP address field, a destination address field, a source port number field, a destination port number field, etc. Rules in model 200 can be defined against any of the header fields in a packet in a flow.

B. State Operations

A stateful NF maintains state in its database and the rules need to interact with the states. Each network function maintains a number of internal states for each flow. State operations 250 defines operations upon such internal states maintained by the network functions. State operations 250 generally includes three different types of operations, namely, a set operation, a get operation, and a timeout operation. Each type of state operations 250 is described under descriptions 230.

Since most NFs maintain states for each flow, the get (f) primitive is used to retrieve the NF's internal state for a particular flow f. Similarly, the set (f, val) primitive allows an operator to initiate or modify the NF's internal state for flow f to value val. The value val here can be a numerical value, a meta data, etc., that indicate a particular state of the flow. Such state information may later be used to make decisions about or take actions on the flow (or a packet in the flow). Different middleboxes may have different definitions for the internal state, and thereby different value val for the flow f. Further, the timeout (f, val) primitive means that if there is no activity for flow f after val seconds, the NF's internal state for f is timed out and the internal state is removed and/or reset.

In some examples, the NFs maintain states for a group of flows. The state operations described herein can be applicable to the group of flows fs in the similar manner in lieu of a single flow f, e.g., set (fs, val), get (fs), timeout (fs, val).

C. Precondition

Preconditions 260 generally refer to conditions that check whether a flow satisfies some properties. Extending the match in Openflow model, the match condition could be defined based on packets and/or flows. Moreover, since NFs may parse application headers from packet payloads, a protoAnalyzer primitive is defined to analyze the protocols of the NF and generate protocol-specific events, assuming that the NF follows layer 5-7 protocol specifications in an Open System Interconnection (OSI) model. Such protocol-specific events may include, but are not limited to, an HTTP request, a FTP request, etc.

Model 200 allows an operator to define a set of protocol-specific events that a rule shall match against. There are three basic types of preconditions 260, namely, an IF (f.p, P) precondition, an IF (f,p) precondition, and an IF (protoAnalyzer (f), P) precondition. Each type of preconditions 260 is described under descriptions 230. Specifically, the IF (f.p, P) precondition detects a match of a packet f.p in flow f on a particular pattern P. Also, the IF (f, P) precondition detects a match of a flow f on a particular pattern P. Likewise, when protoAnalyzer (f) generates an event of a flow f, the IF (protoAnalyzer (f), P) precondition checks if the generated event matches a particular pattern P.

D. Action

Action 270 can be applied on an individual packet p or on an entire flow f, e.g., applying the same action on every packet of the flow. The actions include, for example, a MODIFY action, a FORWARD action, a DROP action, an ENCAP action, a DECAP action, a RATELIMIT action, etc. Each type of action 270 is described under descriptions 230. Specifically, the NF may perform a MODIFY action to modify a packet or a header field; the NF may perform a FORWARD action to forward a packet or a flow; the NF may perform a DROP action to drop transmission of a packet or a flow; the NF may perform an ENCAP action to encapsulate a packet or a header field; the NF may perform a DECAP action to decapsulate a packet or a header field; the NF may perform a RATELIMIT action to limit transmission rate of a packet or a flow.

Abstract Model Examples

Using the primitives, example models are built for NFs. These examples include a network address translator (NAT), a load balancer, a stateful firewall, an injection detection system (IDS), a cache proxy, a virtual private network (VPN) gateway, and a packet data network (PDN) gateway. These NFs provide examples of NFs that can be modeled using the above primitives defined in model 200.

A. Network Address Translator (NAT)

Figure 3A:
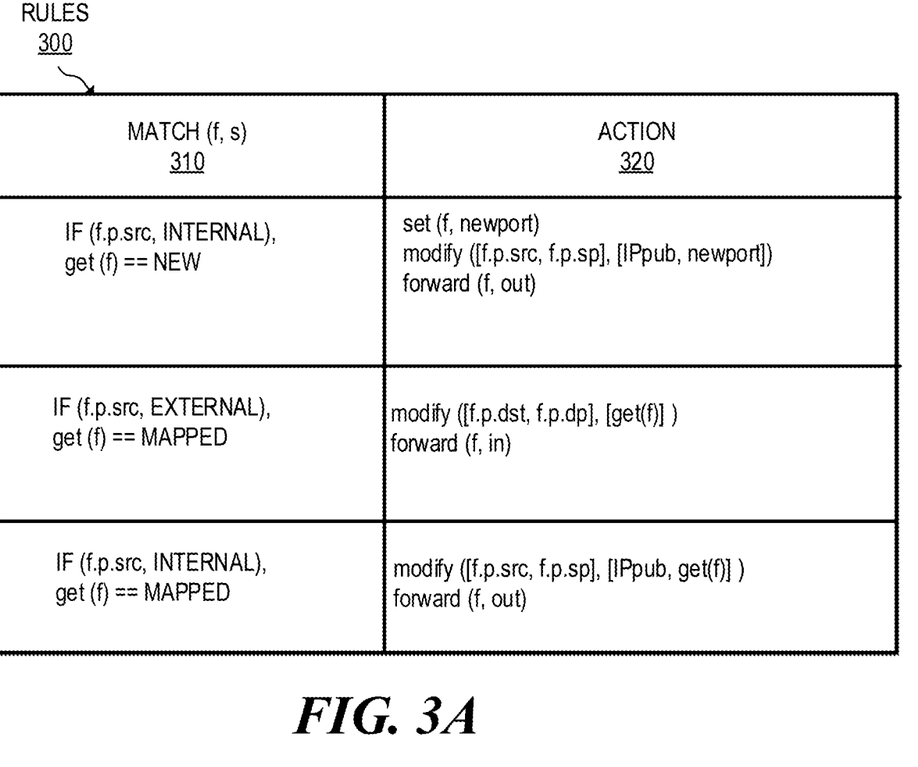
FIGS. 3A-3B are block diagrams illustrating an example network address translator (NAT) model.
Figure 3B:
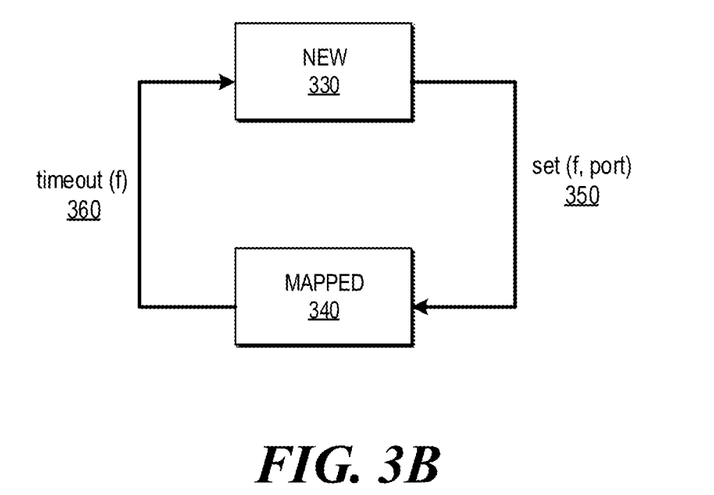

FIGS. 3A-3B are block diagrams illustrating an example network address translator (NAT) model. Specifically, FIG. 3B shows the state machine of an example model of a simple Network Address Translator (NAT). The state maintained for each flow is a mapping between the (source IP, source port) of an existing flow and a chosen port of the NAT. There are two states for each flow: (1) there exists a mapping for the flow (e.g., MAPPED 340), and a port has been previously assigned to the flow; or (2) it is a new flow (e.g., NEW 330). The state NEW 330 can transition to the state MAPPED 340 when the NF performs the state operation set (f, port) 350. Furthermore, the state MAPPED 340 can transition to the state NEW 330 when the NF performs the state operation timeout (f) 360.

Moreover, FIG. 3A shows example rules 300 in this example NAT model. Each rule includes a precondition that is described in MATCH (f, s) 310 and an action by the NF that is described in ACTION 320. Rules 300 for the example NAT model generally match on the packet header and the states, rewrite the source IP and/or source port, and set the states accordingly. In particular, the first rule indicates that if the source IP address of a packet in a flow is an internal address and the NF's current state is NEW 330, then a series of actions will be taken. These actions include: (1) assigning the flow f to a newport and setting the state of the flow f from NEW 330 to MAPPED 340; (2) modifying the packet's source IP address and source port to be the device's source IP address (e.g., IPpub) and source port (e.g., newport); and (3) forwarding the packet through an out port (e.g., an inside facing port of the device implementing the example NAT model) to an outside host.

The second rule indicates that if the source IP address of a packet in a flow is an external address (e.g., an ingress packet from an external source) and the NF's current state is MAPPED 340, then a series of actions will be taken. These actions include: (1) modifying the packet's destination IP address and destination port to be the assigned port for this flow based on a mapping between the original source IP address and the source port; and (2) forwarding the packet through an in port (e.g., an inside facing port of the device implementing the example NAT model) to an inside host. Here, get (f) returns a tuple of the original source IP address and the original source port for the corresponding egress packets in the flow. Because the source address and source port are changed by the NAT for the egress packets in the flow using the first rule, the NAT model uses the second rule to change back the destination address and destination port of the corresponding ingress packets in the flow.

The third rule indicates that if the source IP address of a packet in a flow is an internal address and the NF's current state is MAPPED 340, then a series of actions will be taken. These actions include: (1) modifying the packet's source IP address and source port to be the device's source IP address (e.g., IPpub) and source port (e.g., get (f)); and (2) forwarding the packet out. Here, get (f) returns the value corresponding to the port that has already been assigned to the flow f.

B. Load Balancer

Figure 4A:
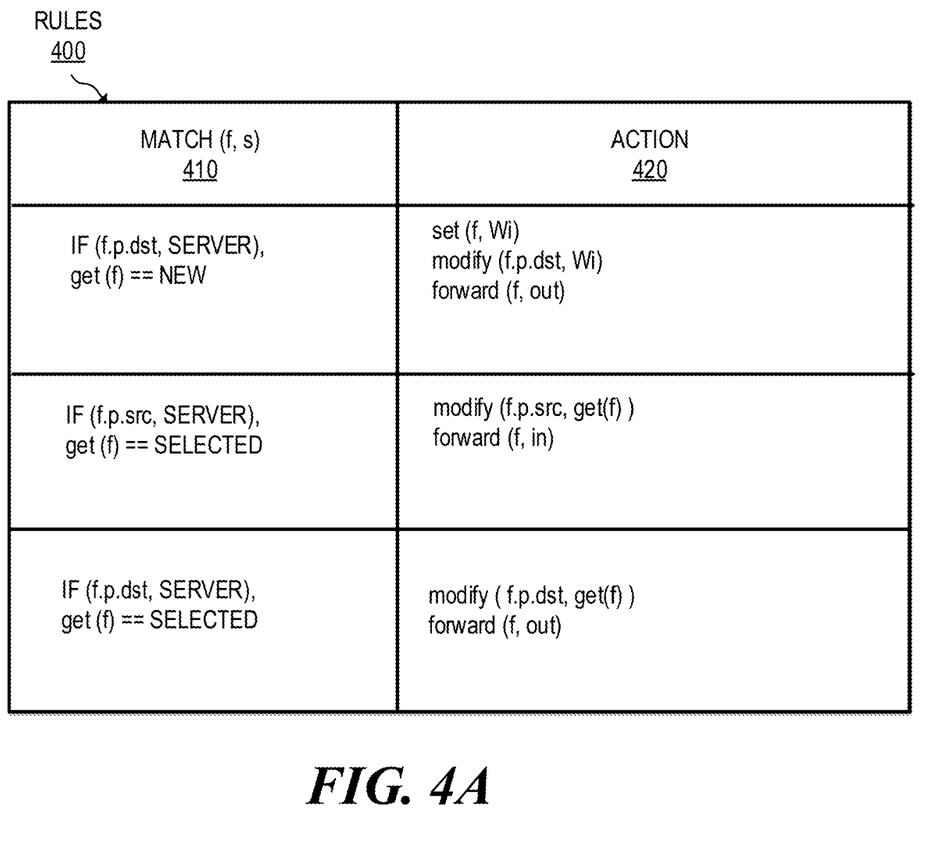
FIGS. 4A-4B are block diagrams illustrating an example web server load balancer model.
Figure 4B:
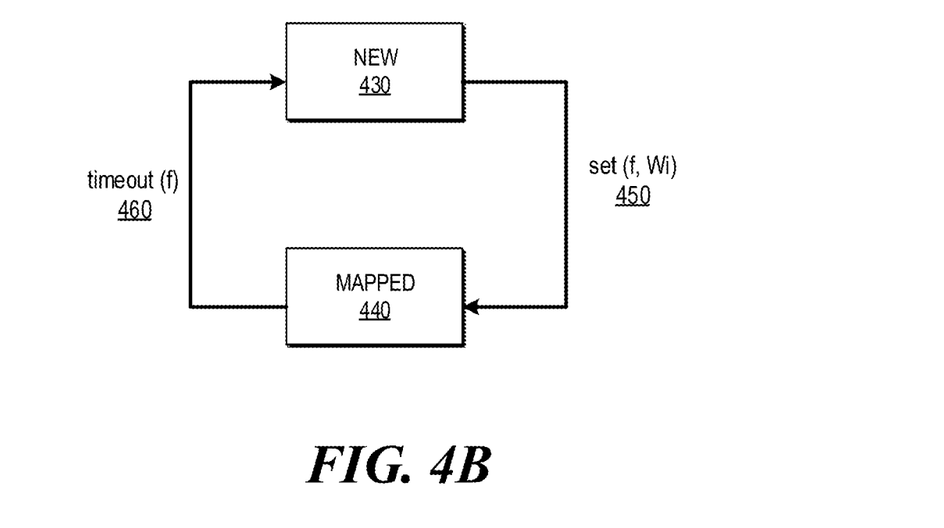

FIGS. 4A-4B are block diagrams illustrating an example load balancer model. Specifically, FIG. 4B shows the state machine of an example model of a server load balancer that selects a server instance from a server pool for a new request, and stores the mapping between the source IP address and the selected server instance Wi. There are two states for each flow: (1) there exists a mapping for the flow (e.g., MAPPED 440) and a server has been previously assigned to the flow, or (2) it is a new flow (e.g., NEW 430). The state NEW 430 can transition to the state MAPPED 440 when the NF performs the state operation set (f, Wi) 450. For example, when a new flow arrives for the server, the load balancer selects a server instance Wi and sets the state for this flow using set (f, Wi) 450. However, if the flow is mapped to an instance, then it gets the same instance using get (f). Regardless, in both cases, the NF modifies the packet's destination IP address accordingly to Wi. Furthermore, the state MAPPED 440 can transition to the state NEW 430 when the NF performs the state operation timeout (f) 460.

Moreover, FIG. 4A shows example rules 400 in this example load balancer model. Each rule includes a precondition that is described in MATCH (f, s) 410 and an action by the NF that is described in ACTION 420. Rules 400 for the example load balancer model generally match on the packet header and the states, select or modify the server instance, and set the states accordingly.

In particular, the first rule indicates that if the destination IP address of a packet in a flow corresponds to a server (e.g., the packet is destined to a web server) and the NF's current state is NEW 430, then a series of actions will be taken. These actions include: (1) selecting the server instance Wi for the flow f and setting the state of the flow f from NEW 430 to MAPPED 440; (2) modifying the packet's destination IP address to be the IP address of the selected server instance (e.g., Wi); and (3) forwarding the packet through an out port to an outside host.

The second rule indicates that if the source IP address of a packet in a flow corresponds to a server (e.g., an incoming packet from a web server) and the NF's current state is SELECTED 440, then a series of actions will be taken. These actions include: (1) modifying the packet's source IP address to be the IP address of the previously selected server instance for this flow; and (2) forwarding the packet through an in port to an inside host. Here, get (f) returns a tuple of the IP address of the server instance Wi selected for the corresponding outgoing packets in the flow. The load balancer model tries to redirect the same flow to the same server instance.

The third rule indicates that if the destination IP address of a packet in a flow corresponds to a web server and the NF's current state is SELECTED 440, then a series of actions will be taken. These actions include: (1) modifying the packet's destination IP address to be the IP address of the previously selected server instance; and (2) forwarding the packet out. Here, get (f) returns the value corresponding to the IP address of the server instance that has already been selected for the flow f.

C. Injection Detection System (IDS)

Figure 5A:
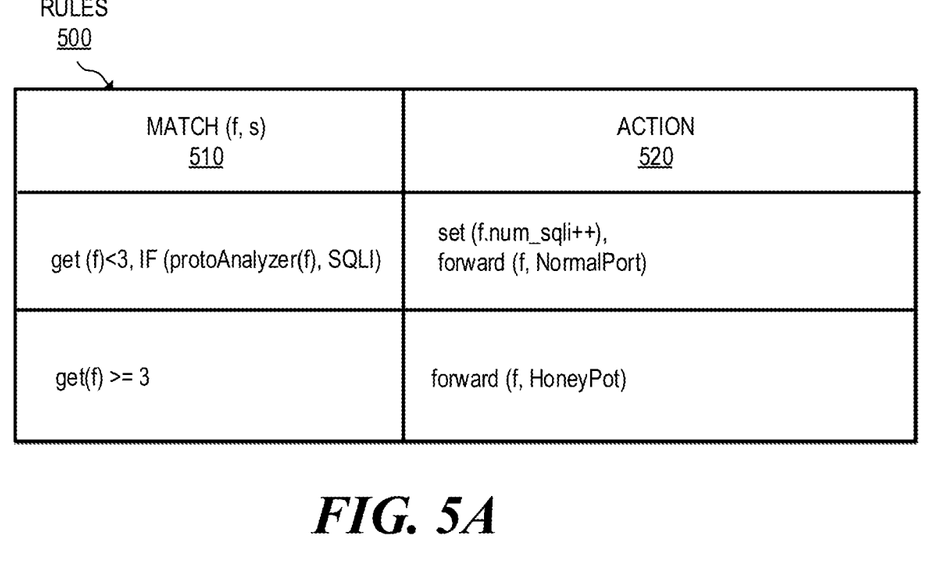
FIGS. 5A-5B are block diagrams illustrating an example injection detection system model.
Figure 5B:
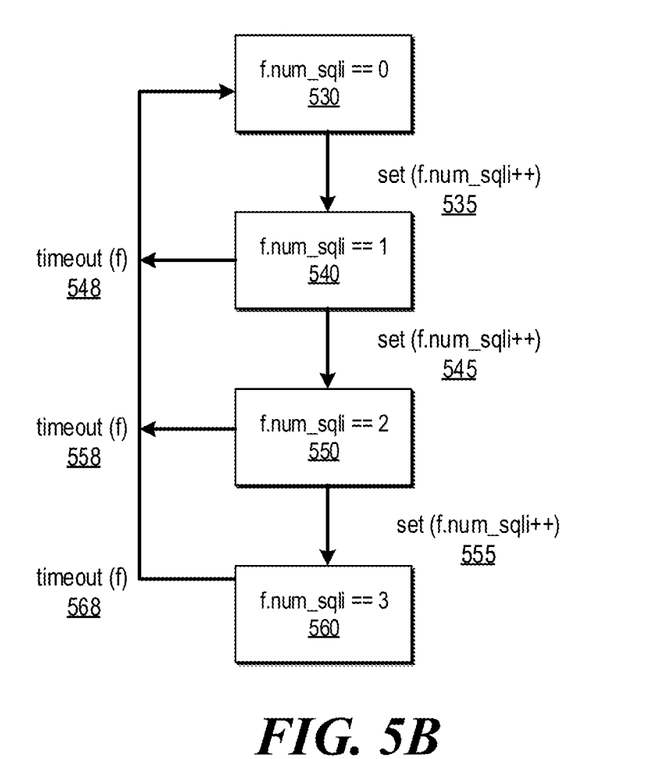

FIGS. 5A-5B are block diagrams illustrating an example injection detection system (IDS) model. Specifically, FIG. 5B shows the state machine of an example model of an injection detection system. To construct an IDS model, an engine parses the injection detection system's configurations. For example, an IDS system (e.g., Bro) may have an Event Engine that runs a protocol analysis, and generates a set of predefined events, e.g., an HTTP request event. These events are then processed by a Policy Script Interpreter, which performs actions on the events according to the configured policies. The policies can be configured through the injection detection system's policy description language. An example of such policies may be that the injection detection system maintains the number of HTTP requests that contains an SQL injection exploit, e.g., num_sqli. If the SQL injection exploit num_sqli is greater than or equal to 3, the flow is sent to a Honeypot. Therefore, there are four states per flow in this example IDS model: in the first state, num_sqli==0 530; in the second state, num_sqli==1 540; in the third state, num_sqli==2 550; and in the fourth state, num_sqli≥3 560. The transition between the above four states is the increment of num_sqli. For example, the state operation set (f.num_sqli++) 535 transitions the state in which f.num_sqli==0 530 to the state in which f.num_sqli==1 540; the state operation set (f.num_sqli++) 545 transitions the state in which f.num_sqli==1 540 to the state in which f.num_sqli==2 550; the state operation set (f.num_sqli++) 555 transitions the state in which f.num_sqli==2 550 to the state in which f.num_sqli==3 560; etc. In some implementations of the IDS model, the first three states 530-550 can be merged into a single state in which num_sqli<3, because they share the same actions.

FIG. 5A shows example rules 500 in this example injection detection system (IDS) model. Each rule includes a precondition that is described in MATCH (f, s) 510 and an action by the NF that is described in ACTION 520. Rules 500 for the example IDS model generally are defined based on the SQL injection exploit (e.g., num_sqli) value. Rules 500 specify that if the SQL injection exploit num_sqli is greater than or equal to 3, the flow f is forwarded to a Honeypot; otherwise, the flow f is forwarded to a NormalPort.

In particular, the first rule indicates that if the current internal state of the flow (f.num_sqli) is less than 3 (e.g., the NF is in states 530-550), and if the protoAnalyzer detects an SQLI event, then the NF changes the internal state by increasing num_sqli by 1, and forwards the flow through a NormalPort.

The second rule indicates that if the current internal state of the flow (f.num_sqli) is greater than or equal to 3 (e.g., the NF is in state 560), then the NF forwards the flow through a HoneyPot.

In this example, the protoAnalyzer primitive is specific to the HTTP. It inspects the payload of a packet in the flow f, and detects a SQL injection in the HTTP request field. If such a SQL injection is detected, the protoAnalyzer will report a SQLI event. Each packet will have zero or one SQL injection. The flow f has many packets. When the total number of packets containing SQL injection increases to three or more, the flow is redirected to a different port, namely the HoneyPot.

D. Stateful Firewall

Figure 6A:
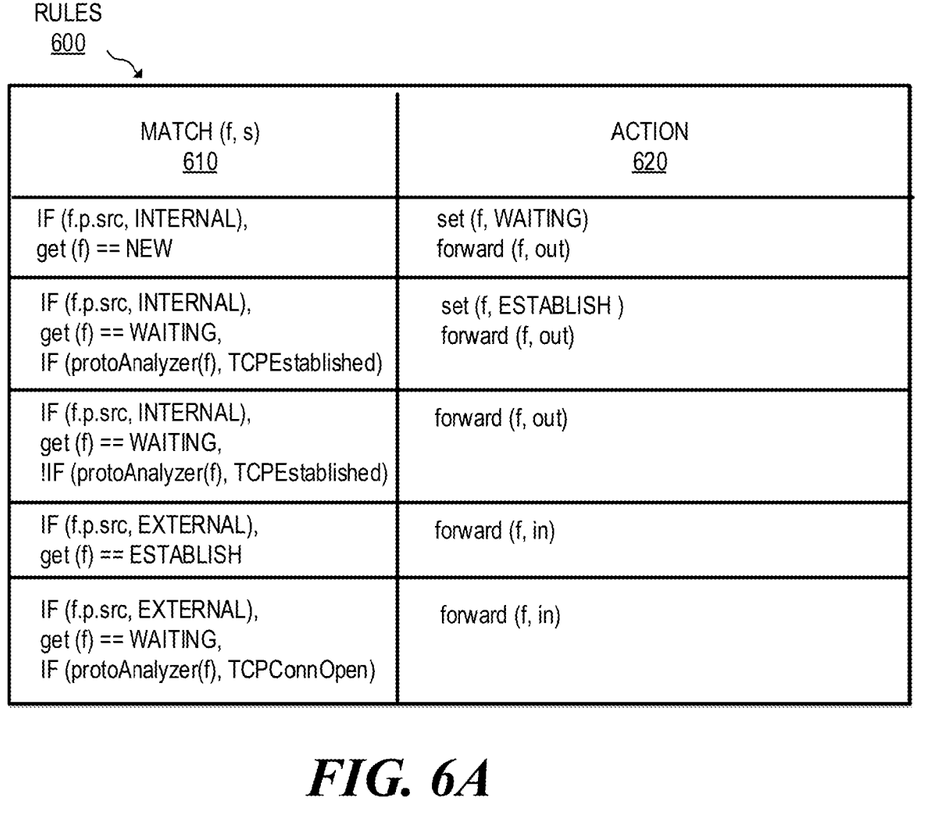
FIGS. 6A-6B are block diagrams illustrating an example stateful firewall model.
Figure 6B:
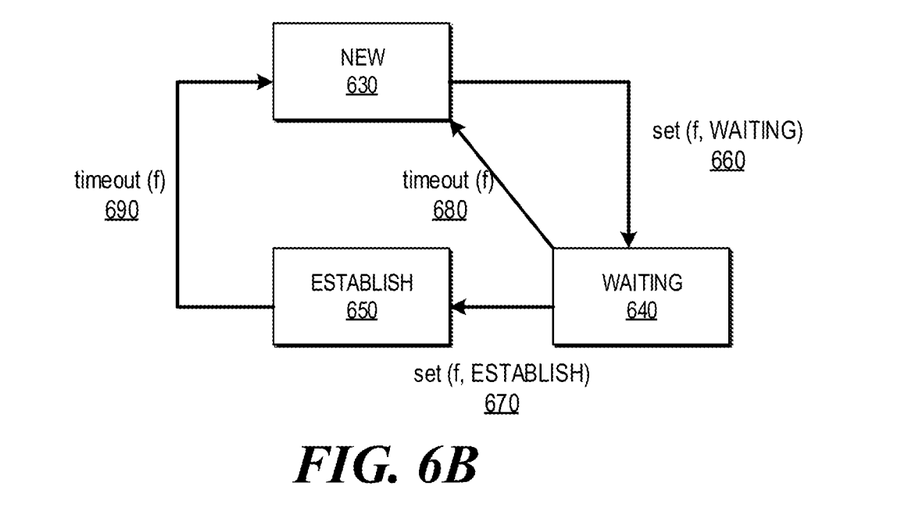

FIGS. 6A-6B are block diagrams illustrating an example stateful firewall model. Specifically, FIG. 6B shows the state machine of an example model of a state firewall. The stateful firewall maintains connection states. In this example, each connection has three states: not seen before (e.g., NEW 630), waiting for TCP-handshake to finish (e.g., WAITING 640), and TCP-handshake established (e.g., ESTABLISH 650). The state NEW 630 can transition to the state WAITING 640 when the NF performs the state operation set (f, WAITING) 660. This occurs when a network node opens a TCP connection by initiating a TCP handshake process. Moreover, the state WAITING 640 can transition to the state ESTABLISH 650 when the NF performs the state operation set (f, ESTABLISH) 670. This occurs when a network node the TCP handshake process is completed and a TCP connection has been established between the network node and another network node. Furthermore, when a predetermined time period elapses, the NF in the state WAITING 640 will timeout (f) 680 and transition to NEW 630. Likewise, when a predetermined time period elapses, the NF in state ESTABLISH 650 will timeout (f) 690 and transition to NEW 630.

In some implementations, rather than enumerating the details of TCP state machine, a TCP protoAnalyzer primitive is used to abstract the stateful behavior. For example, the protoAnalyzer outputs protocol-specific events (e.g., TCP-related events), such as, a Connection Open (TCPConnOpen) event, a Connection Closed (TCPConnClosed) event, a Session Established (TCPEstablished) event, or any other event that is defined in the standard relating to a particular protocol (e.g., TCP).

FIG. 6A shows example rules 600 in this example stateful firewall model. Each rule includes a precondition that is described in MATCH (f, s) 610 and an action by the NF that is described in ACTION 620. Rules 600 for the example stateful firewall model generally are defined using both the packet header fields and the output of the TCP protocol analyzer. Rules 600 specify that an external packet will be forwarded if it is a SYN/ACK message for a connection initiated by internal hosts, or if it belongs to an established connection.

In particular, the first rule indicates that if the source IP address of a packet p in a flow f is an internal address and the flow f is a new flow, then the NF will change the internal state of the flow f from NEW 630 to WAITING 640, and forward the flow through an out port.

The second rule indicates that if the source IP address of a packet p in a flow f is an internal address and the internal state of the flow f is WAITING 640, and if a protocol analyzer of the flow f returns an event TCPEstablished, then the NF sets the flow's internal state to WAITING 640 and forwards the flow through the out port.

The third rule indicates that if the source IP address of a packet p in a flow f is an internal address and the internal state of the flow f is WAITING 640, but the protocol analyzer of the flow f returns an event that is not TCPEstablished, then the NF forwards the flow through the out port without changing the state (i.e., the internal state of the flow remains at WAITING 640).

The fourth rule indicates that if the source IP address of a packet p in a flow f is an external address and the internal state of the flow f is ESTABLISH 650, then the NF forwards the flow through the in port without changing the state (i.e., the internal state of the flow remains at ESTABLISH 650).

The fifth rule indicates that if the source IP address of a packet p in a flow f is an external address and the internal state of the flow f is WAITING 640, and if the protocol analyzer of the flow f returns an event TCPConnOpen (i.e., the TCP connection is open), then the NF forwards the flow through the in port.

The fourth and fifth rules above imply that, for any incoming packet in a flow, the NF will not forward the packet and/or flow unless (1) the internal state of the flow is ESTABLISH, or (2) the internal state of the flow is WAITING and the TCP connection is open. Therefore, a stateful firewall represented by the model illustrated in FIGS. 6A-6B forwards an ingress packet if there is an established TCP connection or a TCP open connection request initiated from an internal host inside the firewall.

Query Language

Figure 7:
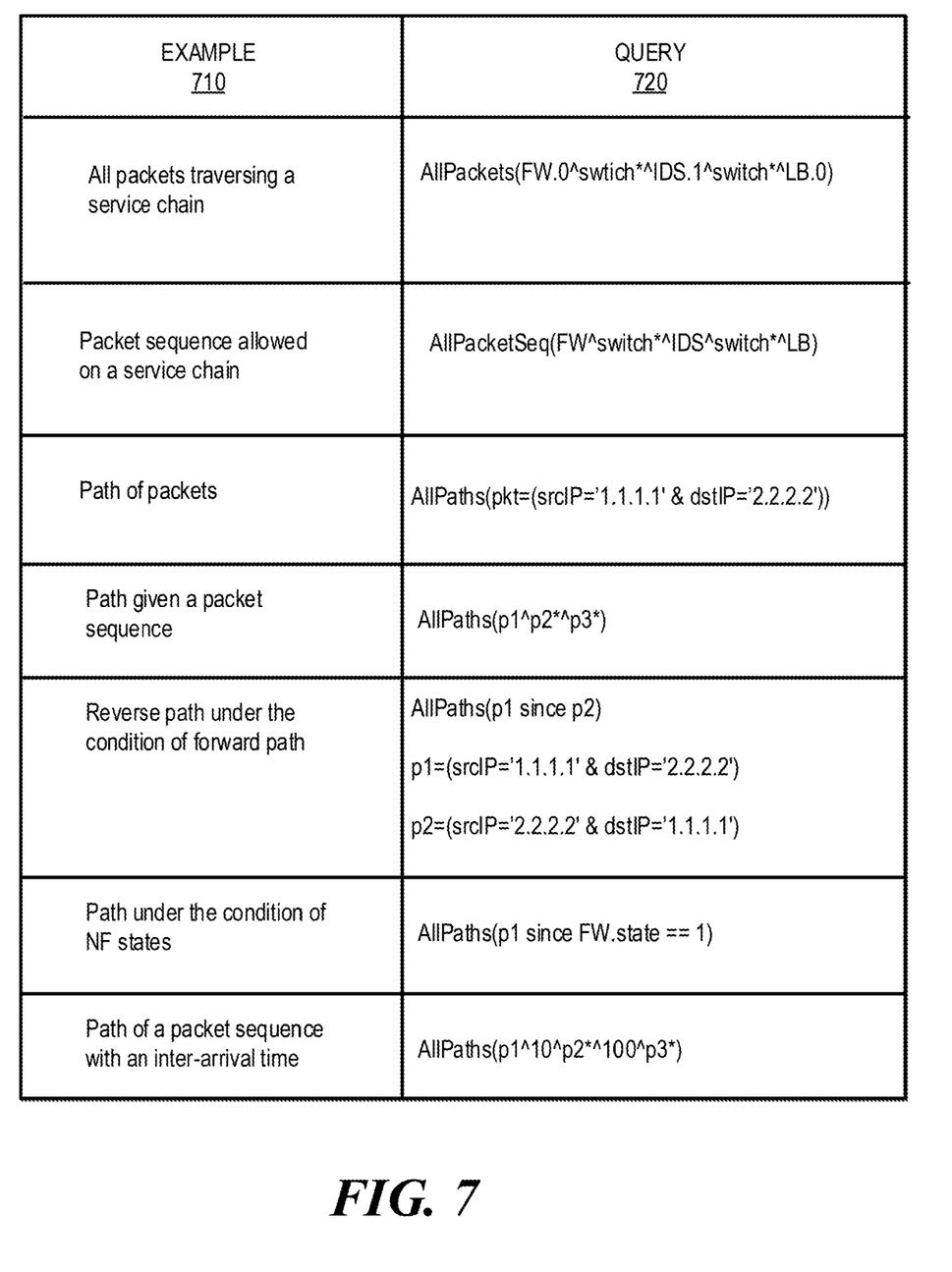
FIG. 7 is a block diagram illustrating example queries using a query language.

FIG. 7 is a block diagram illustrating example queries using a query language. The query language introduces a new list of query language primitives, and describes the stateful requirement in the query.

In particular, a temporal logic is used to construct the query. The temporal logic provides logical operators that specifies the temporal relationship between items. For example, the temporal logic specific operators may include, but are not limited to:

◇, which indicates "sometime in the future;"
□, which indicates "always in the future;"
♦, which indicates "sometime in the past;"
■, which indicates "always in the past."

The primitives of the query language includes:

packetSeq ::=pkt | t | packetSeq ^ packetSeq| (packetSeq| packetSeq) | packetSeq*
pathlet ::=loc | pathlet^ pathlet | (pathlet | pathlet) | pathlet*
loc ::=switch | NF | NF.state==value
pred=packetSeq | pathlet | pred & pred | (pred | pred) | ~pred | pred until pred | pred since pred | ◇ pred | □ pred | ♦ pred | ■ pred Output path given a particular packet or packet sequence: AllPaths (pred)

Output packets given a particular path: AllPackets (pred); AllPacketSeq(pred)

Using these primitives, the user can conduct different queries, e.g., asking different questions about the system that the model represents. In FIG. 7, column EXAMPLE 710 includes a list of example tasks, and column QUERY 720 includes a list of queries constructed using the above primitives to accomplish each task.

Specifically, the first query AllPackets (FW.0^switch*^IDS.1^switch*^LB.0) inquires all packets that traverse a particular network function chain, which includes a particular firewall (e.g., FW.0), zero or more switches, a particular injection detection system (e.g., IDS.1), followed by zero or more switches, and a load balancer (e.g., LB.0). The second query AllPacketSeq (FW^switch*^IDS^switch*^LB) inquires all packet sequences that are allowed on a particular service chain, which includes any firewall, zero or more switches, any IDS, followed by zero or more switches, and any load balancer. The third query AllPaths (pkt=(srcIP='1.1.1.1' & dstIP='2.2.2.2')) inquires all of the paths that packets from the source IP address "1.1.1.1" to destination IP address "2.2.2.2" will traverse. The fourth query AllPaths (p1^p2*^p3*) inquires all of the paths given a packet sequence. Here, the packet sequence include a p1, followed by zero or more p2, which is followed by zero or more p3.

Moreover, the fifth query AllPaths (p1 since p2) inquires all of the paths of packet p1 since p2. Here, "since p2" means that after p2 happened. The definition p1=(srcIP='1.1.1.1' & dstIP='2.2.2.2') indicates that packet p1 corresponds to a source IP address of "1.1.1.1" and a destination IP address of "2.2.2.2." Likewise, the definition p2=(srcIP='2.2.2.2' & dstIP='1.1.1.1') indicates that packet p1 corresponds to a source IP address of "2.2.2.2" and a destination IP address of "1.1.1.1," which traverses a reverse path of p1. Therefore, the fifth query will return all of the paths traversed by such packets p1, whose source IP address is "1.1.1.1" and destination IP address is "2.2.2.2," after the device has detected packet p2 traveling in the reverse direction (e.g., from a source IP address of "2.2.2.2" to a destination IP address of "1.1.1.1").

The query can also be constructed to inquire path under the condition of network function states. For example, the sixth query AllPaths (p1 since FW.state==1) inquires all of the paths for p1 since the firewall state reaches 1, which may represent, e.g., ESTABLISH.

Finally, the query can be constructed to inquire a path of a packet sequence with an inter-arrival time. For example, the seventh query inquires all of the paths traversed by a packet sequence, in which first arrived p1, then after 10 milliseconds arrives zero or more p2, and then after 100 milliseconds arrives zero or more p3.

Processes to Verify a Network Function

Figure 8:
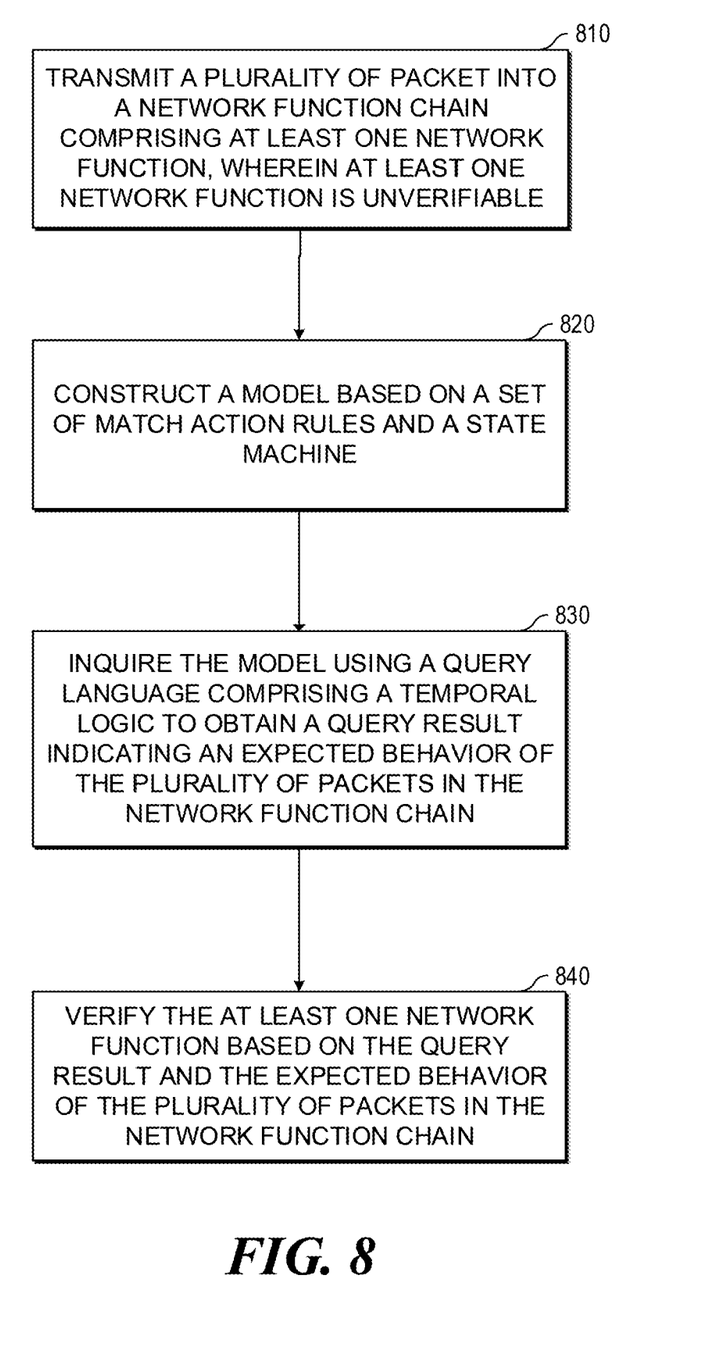
FIG. 8 is a flowchart of an example process to verify a network function.

In discussing FIG. 8, references may be made to the components in FIGS. 1-7 to provide contextual examples. In one implementation, the system described in FIG. 1 executes operations 810-840 to verify a network function by inquiring a model using a query language. Further, although FIG. 8 is described as implemented by a network device, it may be executed on other suitable devices or components. For example, FIG. 8 may be implemented in the form of executable instructions on a machine-readable storage medium 920 as in FIG. 9.

FIG. 8 is a flowchart of an example process to verify a network function. First, a network device transmits a plurality of packet into a network function chain comprising at least one network function, wherein the at least one network function is unverifiable (operation 810). In one example, the at least one network function is unverifiable because the source code of the network function is unavailable. Other reasons may cause the network function to be unverifiable as well. The at least one network function herein includes, but is not limited to, a network address translator (NAT), a server load balancer, a stateful firewall, an injection detection system (IDS), a cache proxy, a virtual private network (VPN) gateway, a packet data network (PDN) gateway (PDW), etc.

Then, the network device constructs a model based on a set of match action rules and a state machine (operation 820). The state machine here represents a plurality of stateful processes. Each node in the state machine represents a state that the at least one network function maintains. Also, each edge in the state machine represents a condition that triggers a transition between different states. The set of match action rules may be, for example, matching on a packet header of the at least one packet, matching on an internal state maintained by the at least one network function, matching on both the packet header and the internal state, performing an action on the at least one packet, changing the internal state, etc.

Also, the model includes a set of primitives, such as, a unit, a state operation, a precondition, and an action. The unit may include, for example, a flow, a packet in the flow, a header field in the packet in the flow, etc. Also, the state operation includes, but is not limited to, a first operation to get the at least one network function's internal state for a flow, a second operation to set the at least one network function's internal state for the flow to a particular value, a third operation to remove the at least one network function's internal state for the flow when no activity for the flow is detected after a predetermined timeout period, etc. Further, the precondition includes, for example, a match of a flow on a particular pattern, a match of a packet in a flow on the particular pattern, a match of an event generated by a protocol analyzer to the particular pattern, and wherein the event is generated by the protocol analyzer parsing the flow, etc. Finally, the action may include a modifying action, a forwarding action, a dropping action, an encapsulating action, a decapsulating action, or a rate limiting action.

Then, the network device inquires the model using a query language comprising a temporal logic to obtain a query result indicating an expected behavior of the plurality of packets in the network function chain (operation 830). The temporal logic specifies a set of logic operators to describe a plurality of temporal relationships. The plurality of temporal relationship includes, for example, a predicate is true sometime in the future; a predicate is true always in the future; a predicate is true sometime in the past; a predicate is true always in the past; etc. The query language permits a stateful query that returns the query result when the at least one network function is in a particular state.

Moreover, the network device verifies the at least one network function based on the query result and the expected behavior of the plurality of packets in the network function chain (operation 840).

Network Device to Verify a Network Function

Figure 9:
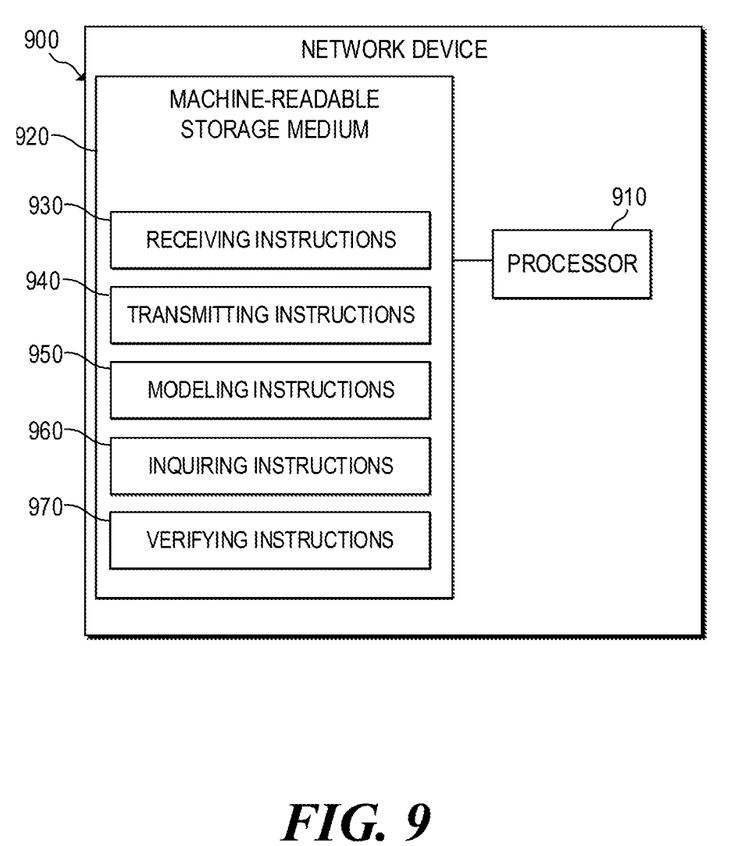
FIG. 9 is a block diagram of an example network device to verify a network function.

FIG. 9 is a block diagram of an example network device with at least one processor 910 to execute instructions 930-970 within a machine-readable storage medium 920 to verify a network function. Although the network device 900 includes at least one processor 910 and machine-readable storage medium 920, it may also include other components that would be suitable to one skilled in the art. For example, network device 900 may include an additional processing component and/or storage. In another implementation, the network device executes instructions 930-970. Network device 900 is an electronic device with the at least one processor 910 capable of executing instructions 930-970, and as such implementations of network device 900 include a mobile device, server, data center, networking device, client device, computer, or other type of electronic device capable of executing instructions 930-970. The instructions 930-970 may be implemented as methods, functions, operations, and other processes implemented as machine-readable instructions stored on the storage medium 920, which may be non-transitory, such as hardware storage devices (e.g., random access memory (RAM), read only memory (ROM), erasable programmable ROM, electrically erasable ROM, hard drives, and flash memory).

The at least one processor 910 may fetch, decode, and execute instructions 930-970 to verify a network function by inquiring a model using a query language. Specifically, the at least one processor 910 executes instructions 930-970 to: transmit a plurality of packets into at least one network function that is unverifiable; construct a model comprising a set of match action rules and a state machine to describe the at least one network function; describe the at least one network function using the constructed model; inquire the model using a query language comprising a temporal logic to obtain a query result indicating an expected behavior of the plurality of packets; verify the at least one network function based on the query result and the expected behavior of the plurality of packets; etc.

The machine-readable storage medium 920 includes instructions 930-970 for the processor 910 to fetch, decode, and execute. In another example, the machine-readable storage medium 920 may be an electronic, magnetic, optical, memory, storage, flash-drive, or other physical device that contains or stores executable instructions. Thus, the machine-readable storage medium 1020 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 920 may include an application and/or firmware which can be utilized independently and/or in conjunction with the at least one processor 910 to fetch, decode, and/or execute instructions of the machine-readable storage medium 920. The application and/or firmware may be stored on the machine-readable storage medium 920 and/or stored on another location of the network device 900.

We claim:

1. A method comprising:
    transmitting a plurality of packets into a network function chain comprising first and second network functions of a plurality of network functions, wherein the first network function is unverified and the second network function is verified, based on unavailability and availability, respectively, of source code corresponding to the first and second network functions;
    constructing a first model of the first network function,
        wherein the model comprises a set of match action rules and a state machine,
        wherein the state machine represents a plurality of stateful processes,
        wherein each node in the state machine represents a state that the at least one network function maintains, and
        wherein each edge in the state machine represents a condition that triggers a transition between different states;
    constructing a second model of the second network function using the source code of the second network function;
    inquiring the first model and the second model using a query language comprising a temporal logic to obtain a query result indicating an expected behavior of the plurality of packets in the network function chain, wherein the temporal logic specifies a set of logic operators to describe a plurality of temporal relationships, the plurality of temporal relationship comprising:
        a predicate is true sometime in the future;
        a predicate is true always in the future;
        a predicate is true sometime in the past; and
        a predicate is true always in the past; and
    verifying the first network function and the second network function based on the query result and the expected behavior of the plurality of packets in the network function chain.

2. The method of claim 1, wherein the first model comprises a set of primitives that include a unit, a state operation, a precondition, and an action.

3. The method of claim 2, wherein the unit comprises a flow, a packet in the flow, and a header field in the packet in the flow.

4. The method of claim 2, wherein the state operation comprises a first operation to get the first network function's internal state for a flow, a second operation to set the first network function's internal state for the flow to a particular value, and a third operation to remove the first network function's internal state for the flow when no activity for the flow is detected after a predetermined timeout period.

5. The method of claim 2, wherein the precondition comprises a match of a flow on a particular pattern, a match of a packet in a flow on the particular pattern, and a match of an event generated by a protocol analyzer to the particular pattern, and wherein the event is generated by the protocol analyzer parsing the flow.

6. The method of claim 2, wherein the action comprises a modifying action, a forwarding action, a dropping action, an encapsulating action, a decapsulating action, and a rate limiting action.

7. The method of claim 1, wherein the set of match action rules comprises rules for at least one of:
matching on a packet header of the at least one packet;
matching on an internal state maintained by the first network function;
matching on both the packet header and the internal state;
performing an action on the at least one packet; and
changing the internal state.

8. The method of claim 1, wherein the first network function comprises:
a network address translator (NAT);
a server load balancer;
a stateful firewall;
an injection detection system (IDS);
a cache proxy;
a virtual private network (VPN) gateway; and
a packet data network (PDN) gateway (PDW).

9. The method of claim 1, wherein the query language permits a stateful query that returns the query result when the first network function is in a particular state.

10. A system comprising at least a memory and a processor coupled to the memory, the processor executing instructions stored in the memory to:
transmit a plurality of packets into a network function chain comprising first and second network functions of a plurality of network functions, wherein the first network function is unverified and the second network function is verified, based on unavailability and availability, respectively, of source code corresponding to the first and second network functions;
construct a first model of the first network function using a model, the model comprising a set of match action rules and a state machine, wherein the state machine represents a plurality of stateful processes, wherein each node in the state machine represents a state that the first network function maintains, and wherein each edge in the state machine represents a condition that triggers a transition between different states;
construct a second model of the second network function using the source code of the second network function;
inquire the first model and the second model using a query language comprising a temporal logic to obtain a query result indicating an expected behavior of the plurality of packets, wherein the temporal logic specifies a set of logic operators to describe a plurality of temporal relationships, the plurality of temporal relationship comprising:
a predicate is true sometime in the future;
a predicate is true always in the future;
a predicate is true sometime in the past; and
a predicate is true always in the past; and
verify the first network function and the second network function based on the query result and the expected behavior of the plurality of packets.

11. The system of claim 10, wherein the first model comprises a set of primitives that include a unit, a state operation, a precondition, and an action.

12. The system of claim 11, wherein the unit comprises a flow, a packet in the flow, and a header field in the packet in the flow.

13. The system of claim 11, wherein the state operation comprises a first operation to get the first network function's internal state for a flow, a second operation to set the first network function's internal state for the flow to a particular value, and a third operation to remove the first network function's internal state for the flow when no activity or no predefined condition is detected for the flow after a predetermined timeout period.

14. The system of claim 11, wherein the precondition comprises a match of a flow on a particular pattern, a match of a packet in a flow on the particular pattern, and a match of an event generated by a protocol analyzer to the particular pattern.

15. The system of claim 11, wherein the action comprises a modifying action, a forwarding action, a dropping action, an encapsulating action, a decapsulating action, and a rate limiting action.

16. The system of claim 10, wherein the query language permits a stateful query that returns the query result when the first network function is in a particular state.

17. A non-transitory machine-readable storage medium encoded with instructions executable by at least one processor of a network device, the machine-readable storage medium comprising instructions to:
transmit a plurality of packets into a network function chain comprising first and second network functions of a plurality of network functions, wherein the first network function is unverified and the second network function is verified, based on unavailability and availability, respectively, of source code corresponding to the first and second network functions;
generate a first model of the first network function, the first model comprising a set of match action rules and a state machine to describe the at least one network function, wherein the state machine represents a plurality of stateful processes, wherein each node in the state machine represents a state that the at least one network function maintains, and wherein each edge in the state machine represents a condition that triggers a transition between different states;
generate a second model of the second network function using the source code of the second network function;
search the first model and the second model using a query language comprising a temporal logic to obtain a query result indicating an expected behavior of the plurality of packets in the network function chain, wherein the temporal logic specifies a set of logic operators to describe a plurality of temporal relationships, the plurality of temporal relationship comprising:
a predicate is true sometime in the future;
a predicate is true always in the future;
a predicate is true sometime in the past; and
a predicate is true always in the past; and
verify the first network function and the second network function based on the query result and the expected behavior of the plurality of packets in the network function chain.

18. The non-transitory machine-readable storage medium of claim 17, wherein the query language permits a stateful query that returns the query result when the first network function is in a particular state.

* * * * *